(12) United States Patent
Doherty et al.

(10) Patent No.: US 11,571,646 B2
(45) Date of Patent: Feb. 7, 2023

(54) AIR SEPARATION MODULES, NITROGEN GENERATION SYSTEMS, AND METHODS OF MAKING AIR SEPARATION MODULES

(71) Applicant: Hamilton Sundstrand Corporation, Charlotte, NC (US)

(72) Inventors: James R. Doherty, Feeding Hills, MA (US); Beakal T. Woldemariam, South Windsor, CT (US); David Anderson, Enfield, CT (US); Donald E. Army, Enfield, CT (US); Eric Surawski, Hebron, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 94 days.

(21) Appl. No.: 16/710,773

(22) Filed: Dec. 11, 2019

(65) Prior Publication Data
US 2021/0178301 A1    Jun. 17, 2021

(51) Int. Cl.
*B01D 46/00* (2022.01)
*B01D 46/24* (2006.01)
*B64D 37/32* (2006.01)

(52) U.S. Cl.
CPC ..... *B01D 46/0004* (2013.01); *B01D 46/0005* (2013.01); *B01D 46/2414* (2013.01); *B64D 37/32* (2013.01); *B01D 2259/4575* (2013.01)

(58) Field of Classification Search
CPC ............ B64D 37/32; B01D 46/0004; B01D 46/0005; B01D 46/2414; B01D 2259/4575; B01D 2256/10; B01D 63/02; B01D 2053/224
See application file for complete search history.

(56) References Cited

U.S. PATENT DOCUMENTS

| | | | |
|---|---|---|---|
| 3,796,026 A | 3/1974 | Mugford | |
| 3,832,830 A | 9/1974 | Gerow | |
| 5,410,999 A | 5/1995 | Gillespie et al. | |
| 8,110,027 B2 | 2/2012 | Beeson | |
| 8,361,181 B2 | 1/2013 | Osendorf et al. | |

(Continued)

FOREIGN PATENT DOCUMENTS

| | | |
|---|---|---|
| CN | 106268335 A | 1/2017 |
| EP | 3020467 A1 | 5/2016 |

(Continued)

OTHER PUBLICATIONS

European Search Report for Application No. 20209734.1, dated May 11, 2021, 52 pages.

(Continued)

*Primary Examiner* — Robert Clemente
(74) *Attorney, Agent, or Firm* — Cantor Colburn LLP (57) ABSTRACT

An air separation module includes a canister extending between a first end and an opposite second end, a separator fixed within the canister to separate a compressed air flow into an oxygen-enriched air flow fraction and an oxygen-depleted air flow fraction, and a one-piece cap. The one-piece cap is connected to the first end of the canister and has a filter module mount portion on a side of the one-piece cap opposite the separator to support a filter module with the air separation module. Nitrogen generation systems and methods of making air separation modules are also described.

19 Claims, 3 Drawing Sheets

(56) References Cited

U.S. PATENT DOCUMENTS

| | | |
|---|---|---|
| 8,979,983 B2 | 3/2015 | Eowsakul |
| 9,452,381 B2 | 9/2016 | Peacos, III et al. |
| 9,700,828 B2 | 7/2017 | Moredock et al. |
| 9,802,159 B2 | 10/2017 | Rekow et al. |
| 9,855,544 B2 | 1/2018 | Peacos, III et al. |
| 9,925,497 B2 | 3/2018 | Daniello |
| 9,932,125 B2 | 4/2018 | McAuliffe et al. |
| 9,932,234 B2 | 4/2018 | Daniello |
| 2006/0201872 A1 | 9/2006 | Fall et al. |
| 2008/0190082 A1 | 8/2008 | Scott et al. |
| 2010/0024649 A1 | 2/2010 | Semmere et al. |
| 2012/0304856 A1 | 12/2012 | Kanetsuki et al. |
| 2012/0312162 A1 | 12/2012 | Theodore et al. |
| 2014/0331857 A1 | 11/2014 | Massey et al. |
| 2014/0360373 A1 | 12/2014 | Peacos et al. |
| 2015/0196871 A1 | 7/2015 | Komiya et al. |
| 2016/0136570 A1* | 5/2016 | McAuliffe ............. B64D 37/32 95/47 |
| 2016/0184761 A1 | 6/2016 | Peacos, III et al. |
| 2016/0184793 A1 | 6/2016 | Peacos, III et al. |
| 2016/0243496 A1 | 8/2016 | Roussn-Bouchard et al. |
| 2017/0074699 A1 | 3/2017 | Mullin et al. |
| 2018/0087698 A1 | 3/2018 | Lenn et al. |
| 2018/0250625 A1 | 9/2018 | Pflueger |
| 2019/0336668 A1 | 11/2019 | Gyoten et al. |
| 2021/0178302 A1 | 6/2021 | Doherty et al. |
| 2021/0178314 A1 | 6/2021 | Doherty et al. |
| 2021/0178315 A1 | 6/2021 | Doherty et al. |
| 2021/0178320 A1 | 6/2021 | Doherty et al. |

FOREIGN PATENT DOCUMENTS

| | | |
|---|---|---|
| EP | 3040278 A1 | 7/2016 |
| EP | 3574937 A1 | 12/2019 |
| EP | 2717998 B1 | 9/2020 |
| GB | 2533585 A | 6/2016 |
| KR | 20180049598 A | 5/2018 |
| KR | 101863855 B1 | 6/2018 |
| WO | 02090823 A1 | 11/2002 |
| WO | 2013079466 A2 | 6/2013 |
| WO | 2017106644 A1 | 6/2017 |

OTHER PUBLICATIONS

European Office Action; European Application No. 20213190.0; dated Jan. 7, 2022; 6 pages.
European Search Report for Application No. 20209888.5, dated May 11, 2021, 85 pages.
European Search Report for Application No. 20213190.0, dated Apr. 30, 2021, 107 pages.
European Search Report for Application No. 20213504.2, dated May 3, 2021, 108 pages.
European Search Report for Application No. 20213555.4, dated May 6, 2021, 155 pages.
Piquet Bruno: "Jul. 2009 Flight Air Worthiness", Jul. 31, 2009 (Jul. 31, 2009), pp. 1-36.
U.S. Non Final Office Action for U.S. Appl. No. 16/710,783, dated Dec. 22, 2021, 12 pages.
U.S. Non-Final Office Action for U.S. Appl. No. 16/710,783, dated Jul. 14, 2021, 20 pages.
U.S. Non-Final Office Action for U.S. Appl. No. 16/710,795, dated Feb. 8, 2022, 36 pages.
U.S. Restriction Requirement for U.S. Appl. No. 16/710,795, dated Oct. 13, 2021, 7 pages.
U.S. Final Office Action for U.S. Appl. No. 16/710,795, dated Jun. 17, 2022, 52 pages.
U.S. Non Final Office Action for U.S. Appl. No. 16/710,761, dated Sep. 14, 2022, 27 pages.
U.S. Notice of Allowance for U.S. Appl. No. 16/710,783, dated Aug. 3, 2022, 14 pages.

* cited by examiner

AIR SEPARATION MODULES, NITROGEN GENERATION SYSTEMS, AND METHODS OF MAKING AIR SEPARATION MODULES

BACKGROUND

The present disclosure generally relates to nitrogen generation systems, and more particularly to air separation modules for nitrogen generation.

Vehicles, such as aircraft, commonly carry fuel in fuel tanks. The fuel generally resides within the fuel tank as a liquid and bounds an ullage space defined within the fuel tank. The atmosphere within the ullage space typically harbors a mixture of fuel vapor and air from the ambient environments. Since mixtures of fuel vapors and ambient air can be potentially hazardous, e.g., due to combustion in the event of a spark or flame, some vehicles employ inerting systems. Inerting systems generally limit oxygen concentration within fuel tank ullage spaces by reducing oxygen concentration in the ullage space to below a level where the atmosphere can support combustion, typically using air separation modules.

Air separation modules separate air received from the ambient environment into an oxygen-enriched air flow and a nitrogen-enriched air flow. The air separation module generally generates the nitrogen-enriched air flow by forcing the ambient air flow through a fiber mat, which separates oxygen molecules from nitrogen molecules according to molecule size. Since ozone molecules entrained in the ambient air flow can infiltrate the nitrogen-enriched air flow, potentially increasing oxygen concentration within the fuel tank and/or causing degradation of certain fuel system components, ozone converters may be arranged upstream of the air separation module to convert entrained ozone into dioxygen. Such ozone converters add size and weight to the nitrogen generation system.

Such systems and methods have generally been acceptable for their intended purpose. However, there remains a need for improved air separation modules, nitrogen generation systems, and methods of making air separation modules for nitrogen generation systems.

BRIEF DESCRIPTION

An air separation module is provided. The air separation module includes a canister extending between a first end and an opposite second end, a separator fixed within the canister to separate a compressed air flow into an oxygen-enriched air flow fraction and an oxygen-depleted air flow fraction, and a one-piece cap. The one-piece cap is connected to the first end of the canister and has a filter module mount portion on a side of the one-piece cap opposite the separator to support a filter module with the air separation module.

In addition to one or more of the features described above, or as an alternative, further examples of the air separation module may include that the filter module mount portion defines an inlet port, the inlet port fluidly coupled to the separator by the filter module mount portion of the one-piece cap.

In addition to one or more of the features described above, or as an alternative, further examples of the air separation module may include that the filter module mount portion defines an inlet channel, the inlet channel fluidly coupled to the separator by the filter module mount portion of the one-piece cap.

In addition to one or more of the features described above, or as an alternative, further examples of the air separation module may include that the filter module mount portion defines a temperature sensor port, the temperature sensor port fluidly coupled to the separator by the filter module mount portion of the one-piece cap.

In addition to one or more of the features described above, or as an alternative, further examples of the air separation module may include that the one-piece cap has a one-piece cap fixation feature configured for fixation of the air separation module within a vehicle.

In addition to one or more of the features described above, or as an alternative, further examples of the air separation module may include that the first end of the canister has a canister first end flange portion and that the one-piece cap is rigidly fixed to the canister first end flange portion.

In addition to one or more of the features described above, or as an alternative, further examples of the air separation module may include that the one-piece cap has a one-piece cap flange portion opposite the filter module mount portion, the one-piece cap flange portion rigidly fixing the one-piece cap the first end of the canister.

In addition to one or more of the features described above, or as an alternative, further examples of the air separation module may include a filter module supported by the one-piece cap, wherein the filter module mount portion fluidly couples the filter module to the separator.

In addition to one or more of the features described above, or as an alternative, further examples of the air separation module may include an inlet temperature sensor seated in the filter module mount, the filter module mount portion fluidly coupling the inlet temperature sensor to the separator.

In addition to one or more of the features described above, or as an alternative, further examples of the air separation module may include that the canister has a canister band portion with a canister fixation feature, that the canister band portion is arranged between the first end and the second end of the canister, and that the canister fixation feature is configured for fixation of the air separation module within a vehicle.

In addition to one or more of the features described above, or as an alternative, further examples of the air separation module may include that the one-piece cap is a nominal-length one-piece cap and further comprising an elongated-length one-piece cap with an elongated one-piece cap fixation feature for fixation of the air separation module within a vehicle, the elongated-length one-piece cap fixed to the second end of the canister.

In addition to one or more of the features described above, or as an alternative, further examples of the air separation module may include a compressed air source fluidly coupled to the filter module mount portion, and a fuel tank fluidly coupled to the compressed air source by the filter module mount portion.

In addition to one or more of the features described above, or as an alternative, further examples of the air separation module may include an outlet temperature sensor supported by the air separation module and fluidly coupled to the compressed air source by the filter module mount portion.

In addition to one or more of the features described above, or as an alternative, further examples of the air separation module may include an oxygen sensor supported by the air separation module and fluidly coupled to the compressed air source by the filter module mount portion.

In addition to one or more of the features described above, or as an alternative, further examples of the air separation module may include a flow control valve supported by the air separation module and fluidly coupled to the compressed air source by the filter module mount portion.

In addition to one or more of the features described above, or as an alternative, further examples of the air separation module may include that the one-piece end cap and filter module mount portion are homogenous in composition and monolithic in construction.

A nitrogen generation system is also provided. The nitrogen generation system includes an air separation module as described above, the first end of the canister defining a canister first end flange portion, and the one-piece cap being rigidly fixed to the canister first end flange portion. The one-piece cap defines a cap flange portion opposite the filter module mount, the cap flange portion rigidly fixing the cap the first end of the canister.

In addition to one or more of the features described above, or as an alternative, further examples of the air separation module may include that the filter module mount portion defines an inlet port, the inlet port fluidly coupled to the separator by the filter module mount portion of the one-piece cap; that the filter module mount portion defines an inlet channel, the inlet channel fluidly coupled to the separator by the filter module mount portion of the one-piece cap; and that the filter module mount portion defines a temperature sensor port, the temperature sensor port fluidly coupled to the separator by the filter module mount portion of the one-piece cap.

In addition to one or more of the features described above, or as an alternative, further examples of the air separation module may include that the one-piece cap has a one-piece cap mounting feature configured for fixation of the air separation module within a vehicle; that the canister has a canister band portion with a canister mounting feature, wherein the canister band portion is arranged between the first end and the second end of the canister, and wherein the canister mounting feature is configured for fixation of the air separation module within a vehicle; and that the one-piece cap is a first one-piece cap having a nominal length and further comprising a second one-piece cap having an elongated length with a second one-piece cap fixation feature for fixation of the air separation module within a vehicle, the second one-piece cap fixed to the second end of the canister.

A method of making an air separation module is additionally provided. The method includes defining a canister extending between a first end and an opposite second end, fixing a separator within the canister to separate a compressed air flow into an oxygen-enriched air flow fraction and an oxygen-depleted air flow fraction; and connecting a one-piece cap to the first end of the canister such that a filter module mount portion of the one-piece cap is on a side of the one-piece cap opposite the separator to support a filter module with the air separation module.

Technical effects of the present disclosure include air separation modules with large oxygen-depleted air flow generating capacity (inerting capability) relative to space occupied by the air separation module. In certain examples air separation modules described herein include one-piece cap s having ozone separator mounts that support the ozone converter without brackets or other mounting hardware, limiting weight and size of the air separation module. In accordance with certain examples the one-piece cap is itself supported by the canister of the air separation module, has no mounting structure for fixation of the air separation module within a vehicle, and is itself fixed within the vehicle through the canister.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
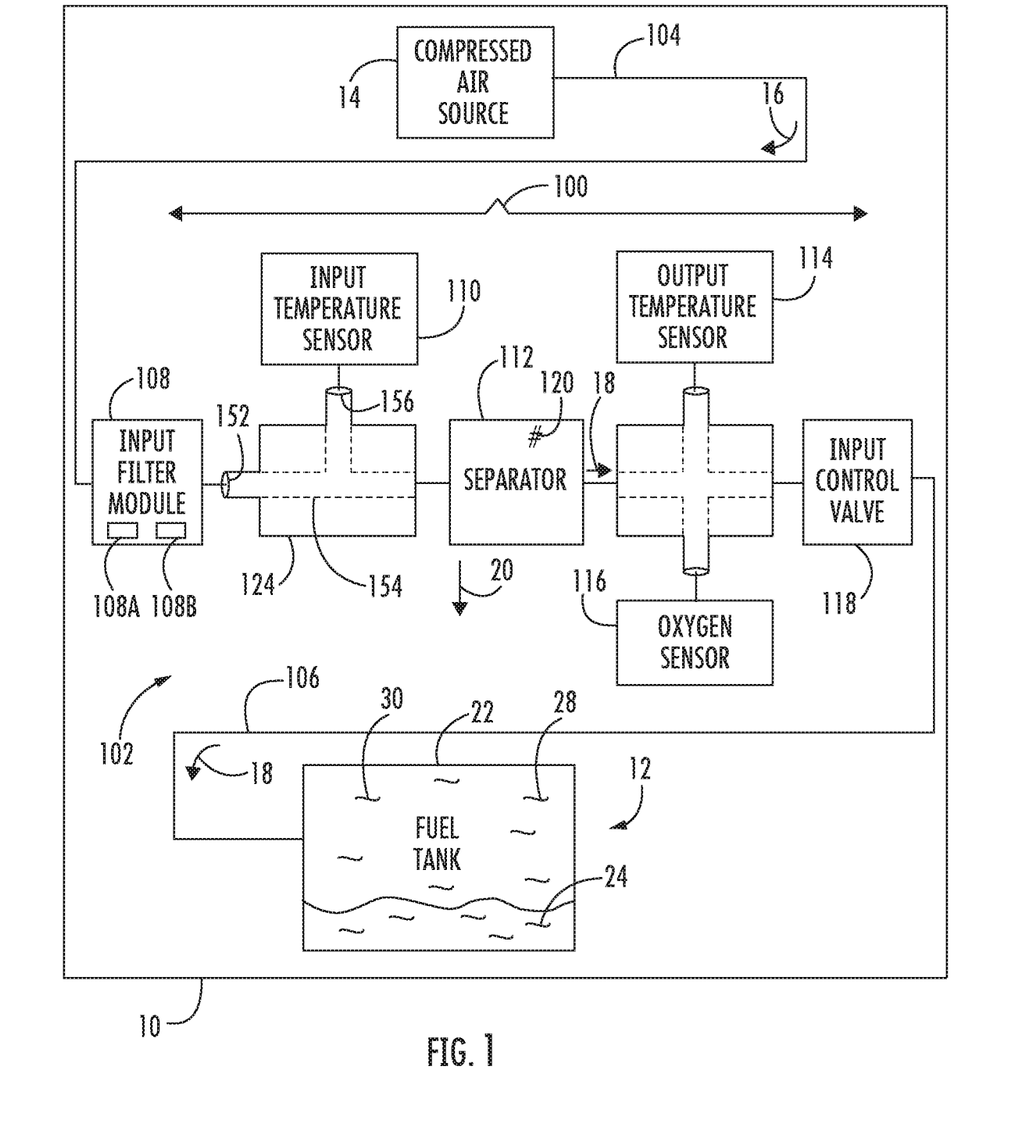
FIG. 1 is a schematic view of an air separation module constructed in accordance with the present disclosure, showing a nitrogen generation system including the air separation module carried by an aircraft and providing an oxygen-depleted air flow to a fuel tank.

Reference will now be made to the drawings wherein like reference numerals identify similar structural features or aspects of the subject disclosure. For purposes of explanation and illustration, and not limitation, a partial view of an example of an air separation module constructed in accordance with the disclosure is shown in FIG. 1 and is designated generally by reference character 100. Other examples of air separation modules, nitrogen generation systems, and methods of making air separation modules, are provided in FIGS. 2-4, as will be described. The systems and methods described herein can be used generating oxygen-depleted air flows for inerting fuel tanks, such as fuel tanks carried in aircraft, though the present disclosure is not limited to aircraft or fuel tanks carried by vehicles in general.

Referring to FIG. 1, a vehicle 10, e.g., an aircraft is shown. The vehicle 10 includes a fuel system 12, a compressed air source 14, and a nitrogen generation system 102. The nitrogen generation system 102 includes the air separation module 100, a source conduit 104, and a supply conduit 106. The source conduit 104 fluidly connects the compressed air source 14 to the air separation module 100. The supply conduit 106 fluidly connects the air separation module 100 to the fuel system 12. In certain examples the nitrogen generation system 102 is an onboard inert gas generation system (OBIGGS) for an aircraft.

The compressed air source 14 is configured to provide a compressed air flow 16 (or pressurized air flow) to the nitrogen generation system 102. In this respect the compressed air source 14 communicates the compressed air flow 16 to the air separation module 100 via the source conduit 104. In certain examples the compressed air source 14 includes a gas turbine engine, such as an aircraft or an auxiliary power unit carried by an aircraft. In accordance with certain examples the compressed air source 14 includes a ground cart mounting a compressor device.

The air separation module 100 includes a filter module 108 containing a debris filter 108A and an ozone converter 108B, an inlet temperature sensor 110, and a separator 112. The air separation module 100 also includes an outlet temperature sensor 114, an oxygen sensor 116, and a flow control valve 118.

The debris filter 108A contained within the filter module 108 is configured to filter entrained debris from the compressed air flow 16 to prevent entrained debris from reaching and/or reducing reliability of the separator 112. The ozone converter 108B contained within the filter module 108 is also configured to convert ozone molecules entrained within the compressed air flow 16 into dioxygen molecules, preventing the entrained ozone molecules from reaching and/or reducing reliability of the separator 112. In this respect the filter module 108 is in fluidly coupled to the source conduit 104 and is in fluid communication with the inlet temperature sensor 110 to communicate thereto the compressed air flow 16 absent debris and ozone entrained within the compressed air flow 16 provided by the compressed air source 14.

The inlet temperature sensor 110 is configured to measure temperature of the compressed air flow 16 provided to the separator 112. In this respect the inlet temperature sensor 110 is fluidly coupled to the filter module 108 to receive therefrom the compressed air flow 16 and is also fluidly coupled to the separator 112 to communicate thereto the compressed air flow 16. In certain examples the inlet temperature sensor 110 is disposed in communication with a controller, which adjusts temperature of the compressed air flow 16 to maintain the compressed air flow 16 within a predetermined inlet temperature range.

The separator 112 is configured to separate the compressed air flow 16 into an oxygen-depleted air flow fraction 18 (i.e. a nitrogen-enriched air flow) and an oxygen-enriched air flow fraction 20. The oxygen-enriched air flow fraction 20 is diverted from the fuel system 12 by the air separation module 100, e.g., is dumped overboard. The oxygen-depleted air flow fraction 18 is communicated by the separator 112 to the fuel system 12 via the outlet temperature sensor 114, the oxygen sensor 116, and the flow control valve 118. In this respect the separator 112 is fluidly coupled to the inlet temperature sensor 110 to receive therefrom the compressed air flow 16 and includes a fiber membrane 120. The fiber membrane 120 is operative to separate the compressed air flow 16 into the oxygen-enriched air flow fraction 20 and the oxygen-depleted air flow fraction 18 according to molecule size. The fiber membrane 120 and shunts the oxygen-enriched air flow fraction 20 to an oxygen-enriched air flow fraction duct 122 (shown in FIG. 2) and communicates the oxygen-depleted air flow fraction 18 to the outlet temperature sensor 114. In certain examples the separator 112 includes a hollow fiber mat. Examples of suitable hollow fiber mats include PEEK-Sep™ hollow fiber mats, available from Air Liquide Advanced Separations of Woburn, Mass.

The outlet temperature sensor 114 is configured to measure temperature of the oxygen-depleted air flow fraction 18 prior to the oxygen-depleted air flow fraction 18 reaching the fuel system 12. In this respect the outlet temperature sensor 114 is fluidly coupled between the separator 112 and the oxygen sensor 116 to measure temperature of the oxygen-depleted air flow fraction 18 from the separator 112 as the oxygen-depleted air flow fraction 18 traverses the air separation module 100. It is contemplated the outlet temperature sensor 114 provide a signal to a controller indicative of temperature of the oxygen-depleted air flow fraction 18, the controller thereby able to control of the oxygen-depleted air flow fraction 18 communicated to the fuel system 12.

The oxygen sensor 116 is configured to measure concentration of oxygen within the oxygen-depleted air flow fraction 18 prior to the oxygen-depleted air flow fraction 18 reaching the fuel system 12. In this respect the oxygen sensor 116 is fluidly coupled between the outlet temperature sensor 114 and the supply conduit 106 to measure oxygen concentration within the oxygen-depleted air flow fraction 18 received from the separator 112 as the oxygen-depleted air flow fraction 18 traverses the air separation module 100. It is contemplated that the oxygen sensor 116 provide a signal to a controller indicative of oxygen concentration within the oxygen-depleted air flow fraction 18, the controller thereby able to monitor performance of the air separation module 100.

The flow control valve 118 is configured to control flow rate, e.g., mass flow rate, of the oxygen-depleted air flow fraction 18 to the supply conduit 106. In this respect the flow control valve 118 is fluidly coupled between the oxygen sensor 116 and the supply conduit 106 to throttle flow of the oxygen-depleted air flow fraction 18 provided by the separator 112. It is contemplated that the flow control valve 118 be operatively associated with a controller to throttle the flow rate of the oxygen-depleted air flow fraction 18 according to the inerting requirements of the fuel system 12 and/or according to the operating requirements of the vehicle 10.

The fuel system 12 includes a fuel tank 22. The fuel tank 22 is fluidly coupled to the air separation module 100 by the supply conduit 106, contains therein a liquid fuel 24, and defines within it interior an ullage space 26. The ullage space 26 harbors an atmosphere including fuel vapor 28 and oxygen-depleted air 30. It is contemplated that the oxygen-depleted air 30 is received from the air separation module 100 via the oxygen-depleted air flow fraction 18. It is also contemplated that the oxygen-depleted air 30 within the ullage space 26 of the fuel tank 22 be sufficient to limit concentration of oxygen within the ullage space 26 to concentrations below that capable of supporting combustion of the fuel vapor 28. Maintaining an oxygen-depleted atmosphere limits (or prevents entirely) possibility of combustion of the fuel vapor 28 in the event that an ignition source comes into communication with the fuel vapor 28.

As will be appreciated by those of skill in the art in view of the present disclosure, the inerting capability provided by air separation modules generally corresponds to the weight and size of the air separation module. To limit weight and size per unit inerting capability provided the air separation module 100 includes one-piece cap 124, e.g., a one-piece end cap, with a filter module mount portion 126 (shown in FIG. 2). The filter module mount portion 126 is configured to directly support the filter module 108 with the air separation module 100, e.g., without additionally bracketing. Supporting the filter module 108 with the air separation module 100 reduces (or eliminates entirely) the need to provision the vehicle 10 with additional structure, e.g., brackets, to support the filter module 108, reducing weight and/or size of the air separation module 100 in relation to air separation modules requiring such provisioning. In certain examples supporting the filter module 108 with the air separation module 100 allows the separator 112 to be larger is size than otherwise possible within an installation envelope of the vehicle 10, the air separation module 100 thereby providing relatively large inerting capability relative to certain legacy air separation modules.

Figure 2:
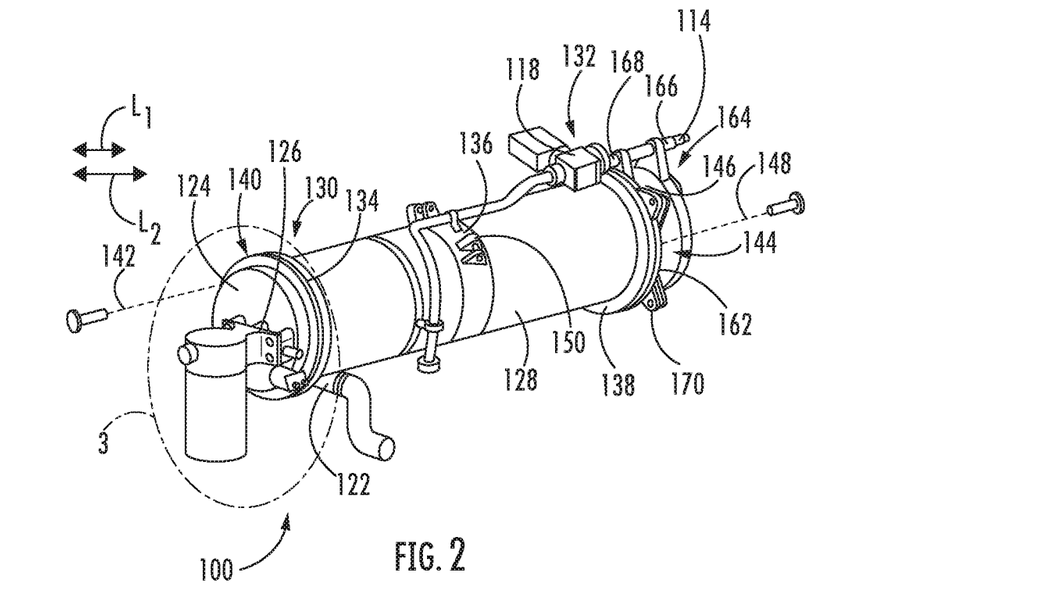
FIG. 2 is a perspective view of the air separation module of FIG. 1 according to an example, showing a first one-piece cap having a filter module mount portion supporting a filter module with an ozone converter.

With reference to FIG. 2, the air separation module 100 is shown according to an example. The air separation module 100 generally includes the separator 112 (shown in FIG. 1), the one-piece cap 124 with the filter module mount portion 126, and a canister 128. The canister 128 extends between a first end 130 and an opposite second end 132. The separator 112 is fixed within the canister 128 to separate the compressed air flow 16 (shown in FIG. 1) into the oxygen-enriched air flow fraction 20 (shown in FIG. 1) and the oxygen-depleted air flow fraction 18 (shown in FIG. 1). The one-piece cap 124 is connected to the first end 130 of the canister 128. The filter module mount portion 126 is arranged on a side of the one-piece cap 124 opposite the separator 112 to support the filter module 108 with the air separation module 100, e.g., in a cantilevered arrangement.

As used in herein the term "one-piece" means that various portions of the associated "one-piece" element are homogenous in composition and monolithic in construction. For example, it is contemplated that the one-piece cap 124 and the filter module mount portion 126 be homogenous in composition and monolithic in construction, e.g., as formed using an investment casting technique, an additive manufacturing technique, or that the one-piece cap 124 and the filter module mount portion 126 be machined from a common piece of stock. As will be appreciated by those of skill in the art in view of the present disclosure, other manufacturing techniques and/or combinations of the aforementioned techniques are possible and are within the scope of the present disclosure.

The canister 128 has a canister first flange portion 134, a canister band portion 136 (e.g., a doubler portion), and a canister second flange portion 138. The canister first flange portion 134 extends about the first end 130 of the canister 128 and defines a canister first fastener pattern 140 to rigidly fix thereon the one-piece cap 124, e.g., with a plurality of first fasteners 142. The canister band portion 136 is arranged between the first end 130 and the second end 132 of canister 128, extends circumferentially about the canister 128, and is formed as a thickened portion of a one-piece body of the canister 128 to provide stiffness to the canister 128. The canister second flange portion 138 is similar to the canister first flange portion 134 and additionally extends about the second end 132 of the canister 128, defines a second fastener pattern 144, and is arranged to rigidly fix thereon seat thereon a second one-piece cap 146, e.g., with a plurality of second fasteners 148. In certain examples a canister fixation feature 150 extends laterally from the canister band portion 136 for fixation of the canister 128, and thereby the air separation module 100, within the vehicle 10 (shown in FIG. 1).

With continuing reference to FIG. 1, in certain examples, the filter module mount portion 126 defines an inlet port 152, an inlet channel 154, and a temperature sensor port 156. The compressed air source 14 (shown in FIG. 1) is fluidly coupled to the filer module mount portion 126 of the one-piece cap 124 by the inlet port 152, the fuel tank 22 thereby being fluidly coupled to the compressed air source 14 by the filter module mount portion 126. The inlet port 152 in turn is fluidly coupled to the separator 112 by the filter module mount portion 126. More specifically, the inlet port 152 is in fluid communication with the inlet channel 154 and is therethrough fluidly coupled to separator 112. The temperature sensor port 156 is fluidly coupled to the separator 112 by the filter module mount portion 126. More specifically, the temperature sensor port 156 is in fluid communication with the inlet channel 154 and is therethrough fluidly coupled to the separator 112. In certain examples the inlet channel 154 is defined within the filter module mount portion 126 to provide fluid communication with the separator 112.

Figure 3:
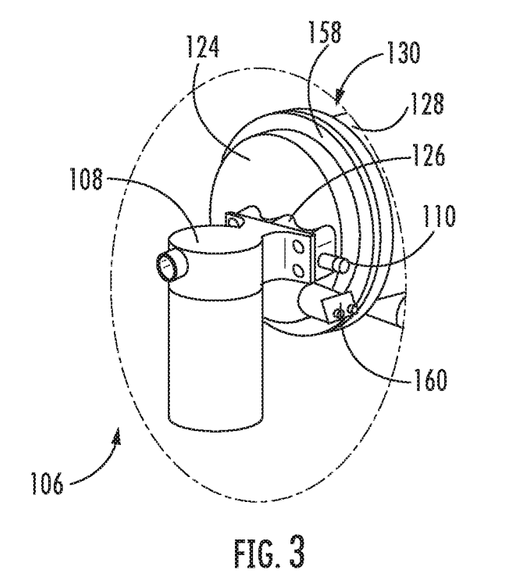
FIG. 3 is a partial perspective view of the air separation module of FIG. 1 according to the example, showing an inlet temperature sensor supported by the filter module mount portion of the first one-piece cap and a first one-piece cap fixation feature of the first one-piece cap.

With reference to FIG. 3, the one-piece cap 124 is shown. As shown in FIG. 3 the one-piece cap 124 includes the one-piece cap flange portion 158, the filter module mount portion 126, and a one-piece cap fixation feature 160. The one-piece cap flange portion 158 is arranged on a side of the one-piece cap 124 opposite the filter module mount portion 126 and rigidly fixes the one-piece cap 124 to the first end 130 of the canister 128. More specifically, the one-piece cap 124 is rigidly fixed to the canister first flange portion 134 by the plurality of first fasteners 142 (shown in FIG. 2). Rigid fixation of the one-piece cap 124 to the first end 130 of the canister 128 allows the one-piece cap 124 to support the filter module 108 and the inlet temperature sensor 110, avoiding the need to support the filter module 108 with separate brackets.

In certain examples the filter module 108 is wholly supported by the one-piece cap 124. In this respect, in the illustrated example, the filter module 108 is supported by the filter module mount portion 126 of the one-piece cap 124, the filter module mount portion 126 fluidly coupling the filter module 108 to the separator 112 through the inlet port 152 (shown in FIG. 1) and the inlet channel 154 (shown in FIG. 1). In accordance with certain examples the inlet temperature sensor 110 is also wholly supported by the one-piece cap 124. In this further respect, as also shown in the illustrated example, the inlet temperature sensor 110 is supported by the filter module mount portion 126 of the one-piece cap 124, and the filter module mount portion 126 fluidly coupling the inlet temperature sensor 110 to the inlet channel 154.

With continuing reference to FIG. 2, the second one-piece cap 146 is similar to the first one-piece cap 124 and has a second one-piece cap flange portion 162, an oxygen sensor seat 164, and an outlet temperature sensor seat 166. The second one-piece cap 146 also has a flow control valve seat 168 and a second one-piece cap fixation feature 170. The second one-piece cap flange portion 162 rigidly fixes the second one-piece cap 146 to the second end 132 of the canister 128. In this respect the second one-piece cap flange portion 162 abuts the canister second flange portion 138 and receives therethrough the second plurality of fasteners 148, which rigidity fix the second one-piece cap 146 to the second end 132 of the canister 128.

The oxygen sensor seat 164 seats thereon the oxygen sensor 116 (shown in FIG. 1). In this respect the air separation module 100 supports the oxygen sensor 116 and the oxygen sensor 116 is thereby fluidly coupled to the compressed air source 14 (shown in FIG. 1) by the filter module mount portion 126 of first one-piece cap 124. The outlet temperature sensor seat 166 seats thereon the outlet temperature sensor 114, the air separation module 100 thereby also supporting the outlet temperature sensor 114 and the outlet temperature sensor 114 being fluidly coupled to the compressed air source 14 by the filter module mount portion 126 of the first one-piece cap 124. The flow control valve seat 168 seats thereon the flow control valve 118, the air separation module 100 thereby additionally supporting the flow control valve 118 and the flow control valve 118 thereby by fluidly coupled to the compressed air source 14 by the filter module mount portion 126 of the first one-piece cap 124.

In certain examples the first one-piece cap 124 can have a nominal length $L_1$ (shown in FIG. 2) and the second one-piece cap 146 have an elongated length $L_2$ (shown in FIG. 2), the first one-piece cap thereby being an elongated-length one-piece cap 124. It is contemplated that the elongated length $L_2$ of the second one-piece cap 146 be greater than the nominal length $L_1$ of the first one-piece cap 124. In such examples the elongated length $L_2$ of the second one-piece cap 146 allows the separator 112 (shown in FIG. 1) to be larger is size than would otherwise be possible for within the confines of the canister 128. As above, increasing size of the separator 112 in turn provides greater inerting capability to the air separation module 100.

Figure 4:
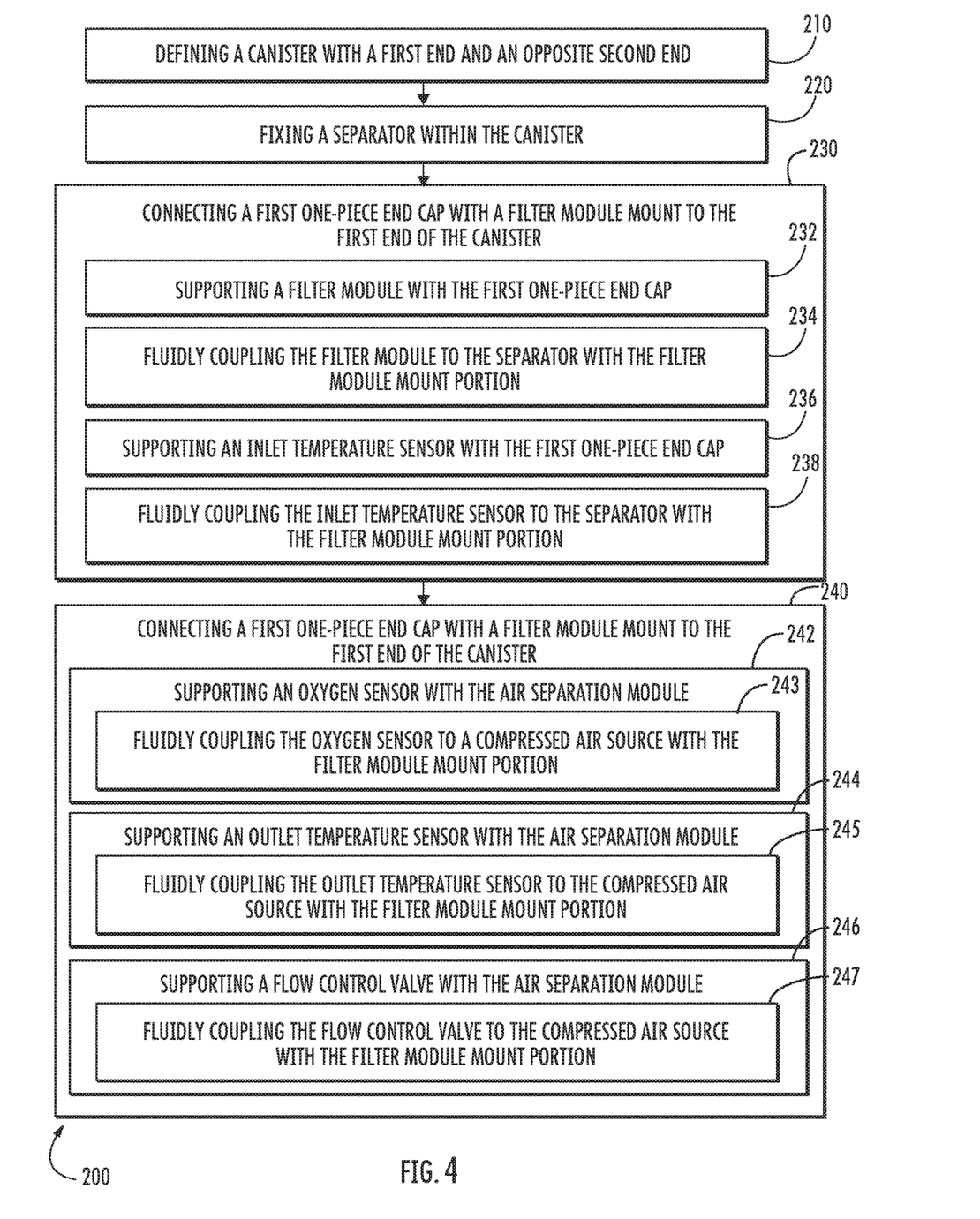
FIG. 4 is a block diagram of a method of making an air separation module, showing operations of the method according to an illustrative and non-limiting example of the method.

With reference to FIG. 4, a method 200 of making air separation module, e.g., the air separation module 100, is shown. The method 200 includes defining a canister having a first and an opposite second end, e.g., the canister 128 (shown in FIG. 2) having the first end 130 (shown in FIG. 2) and the second end 132 (shown in FIG. 2), as shown with box 210. The method 200 also includes fixing a separator within the canister, e.g., the separator 112 (shown in FIG. 1), as shown with box 220. The method 200 additionally includes connecting a first one-piece cap, e.g., the first one-piece cap 124 (shown in FIG. 2), to the first end of the canister, as shown with box 230. As shown with box 240, in certain examples the method 200 additionally includes connecting a second one-piece cap, e.g., the second one-piece cap 146 (shown in FIG. 2), to the second end of the canister.

As shown with box 232, connecting the first one-piece cap to the canister includes supporting a filter module, e.g., the filter module 108 (shown in FIG. 1) with the first one-piece cap—and thereby with the air separation module. As shown with box 234, connecting the first one-piece cap to the canister includes fluidly coupling the filter module to the separator through a filter module mount portion of the first one-piece cap, e.g., the first module mount portion 126. In certain examples the method 200 additionally includes supporting an inlet temperature sensor, e.g., the inlet temperature sensor 110 (shown in FIG. 1), with the first one-piece cap—and thereby with the air separation module, as shown with box 236. In accordance with certain examples the method 200 further includes fluidly coupling the inlet temperature sensor to the separator with the filter module mount portion, as show with box 238.

As shown with box 242, connecting the second one-piece cap to the second end of the canister includes supporting an oxygen sensor, e.g., the oxygen sensor 116 (shown in FIG. 1), with the air separation module. This can include fluidly coupling the oxygen sensor to a compressed air source, e.g., the compressed air source 14 (shown in FIG. 1), with the filter module mount portion of the second one-piece cap, as shown with box 243. Further, as shown with box 244, connecting the second one-piece cap the second end of the canister can also include supporting an outlet temperature sensor, e.g., the outlet temperature sensor 144 (shown in FIG. 1), with the air separation module. Supporting the outlet temperature sensor with the air separation module can also include fluidly coupling the outlet temperature sensor to the compressed air source with the filter module mount portion of the second one-piece cap, as shown with box 245. It is also contemplated that, in accordance with certain examples, a flow control valve, e.g., the flow control valve 118 (shown in FIG. 1), can be supported by the air separation module, as shown by box 246. Supporting the flow control valve with the air separation module may include fluidly coupling the flow control valve to the compressed air source through the filter module mount portion of the second one-piece cap, as shown with box 247.

Fuel tanks, such as fuel tanks used to store liquid fuel in vehicles like aircraft, commonly contain fuel vapors within the ullage space of the fuel tank. Because such fuel vapors can present a fire hazard some vehicles include nitrogen generation systems with air separation modules. The air separation module is typically arranged to provide a flow of oxygen-depleted air to the fuel tank ullage space, limiting concentration of oxygen within the fuel tank ullage space and reducing (or eliminating entirely) the fire hazard potentially posed by the fuel vapors. The volume of nitrogen enriched air is generally constrained by the size of the air separation module and space allocated to the air separation module within the vehicle.

In examples provided herein air separation modules are provided having filter modules supported by the air separation module. Supporting the filter module with the air separation module limits (or eliminates entirely) the need to support the filter module with a filter bracket or other structure, reducing size and/or weight of the air separation module. In certain examples the filter module is connected directly to a one-piece cap of the air separation module, the one-piece cap in turn communicating the load associated with the filter module to vehicle structure through the one-piece cap. The size and/or weight reduction allows the air separation module to include a relatively large separator, increasing inerting capability of the air separation module in relation the certain legacy air separation modules otherwise employed with the installation envelope of the air separation module The term "about" is intended to include the degree of error associated with measurement of the particular quantity based upon the equipment available at the time of filing the application.

The terminology used herein is for the purpose of describing particular examples only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an example or examples, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular example disclosed as the best mode contemplated for carrying out this present disclosure, but that the present disclosure will include all examples falling within the scope of the claims.

What is claimed is:

1. An air separation module, comprising:
   a canister having a first end and a second end;
   a separator fixed within the canister configured to separate a compressed air flow into an oxygen-enriched air flow fraction and an oxygen-depleted air flow fraction;
   a one-piece cap connected to the first end of the canister, wherein the one-piece cap has a filter module mount portion on a side of the one-piece cap opposite the separator, the filter module mount portion being to support a filter, wherein the one-piece cap is a nominal-length one-piece cap; and
   an elongated-length one-piece cap with an elongated one-piece cap fixation feature for fixation of the air separation module within a vehicle, the elongated-length one-piece cap fixed to the second end of the canister.

2. The air separation module of claim 1, wherein the filter module mount portion defines an inlet port, the inlet port fluidly coupled to the separator by the filter module mount portion of the one-piece cap.

3. The air separation module of claim 1, wherein the filter module mount portion defines an inlet channel, the inlet channel fluidly coupled to the separator by the filter module mount portion of the nominal length one-piece cap.

4. The air separation module of claim 1, wherein the filter module mount portion defines a temperature sensor port, the temperature sensor port fluidly coupled to the separator by the filter module mount portion of the nominal-length one-piece cap.

5. The air separation module of claim 1, wherein the nominal-length one-piece cap has a one-piece cap fixation feature configured for fixation of the air separation module within a vehicle.

6. The air separation module of claim 1, wherein the first end of the canister has a canister first end flange portion, wherein the one-piece cap is rigidly fixed to the canister first end flange portion.

7. The air separation module of claim 1, wherein the nominal-length one-piece cap has a one-piece cap flange portion opposite the filter module mount portion, the one-piece cap flange portion rigidly fixing the nominal length one-piece cap to the first end of the canister.

8. The air separation module of claim 1, further comprising a filter module supported by the nominal-length one-piece cap, wherein the filter module mount portion fluidly couples the filter module to the separator.

9. The air separation module of claim 1, further comprising an inlet temperature sensor seated in the filter module mount, wherein the filter module mount portion fluidly couples the inlet temperature sensor to the separator.

10. The air separation module of claim 1, wherein the canister has a canister band portion with a canister fixation feature, wherein the canister band portion is arranged between the first end and the second end of the canister, and wherein the canister fixation feature is configured for fixation of the air separation module within a vehicle.

11. The air separation module of claim 1, further comprising an outlet temperature sensor supported by the air separation module and fluidly coupled to the compressed air source by the filter module mount portion.

12. The air separation module of claim 1, further comprising an oxygen sensor supported by the air separation module and fluidly coupled to the compressed air source by the filter module mount portion.

13. The air separation module of claim 1, further comprising a flow control valve supported by the air separation module and fluidly coupled to the compressed air source by the filter module mount portion.

14. The air separation module of claim 1, wherein the nominal-length one-piece end cap and filter module mount portion are homogenous in composition and monolithic in construction.

15. A nitrogen generation system, comprising:
an air separation module as recited in claim 1, wherein the first end of the canister defines a canister first end flange portion, wherein the nominal-length one-piece cap is rigidly fixed to the canister first end flange portion; and
wherein the nominal-length one-piece cap defines a cap flange portion opposite the filter module mount, the cap flange portion rigidly fixing the cap to the first end of the canister.

16. The nitrogen generation system of claim 15, wherein the filter module mount portion defines an inlet port, the inlet port fluidly coupled to the separator by the filter module mount portion of the one-piece cap;
wherein the filter module mount portion defines an inlet channel, the inlet channel fluidly coupled to the separator by the filter module mount portion of the nominal-length one-piece cap; and
wherein the filter module mount portion defines a temperature sensor port, the temperature sensor port fluidly coupled to the separator by the filter module mount portion of the nominal-length one-piece cap.

17. The nitrogen generation system of claim 15, wherein nominal-length one-piece cap has a one-piece cap mounting feature configured for fixation of the air separation module within a vehicle;
wherein the canister has a canister band portion with a canister mounting feature, wherein the canister band portion is arranged between the first end and the second end of the canister, and wherein the canister mounting feature is configured for fixation of the air separation module within a vehicle.

18. The nitrogen generation system of claim 15, further comprising:
a compressed air source fluidly coupled to the filter module mount portion;
an outlet temperature sensor supported by the air separation module and fluidly coupled to the compressed air source by the filter module mount portion;
an oxygen sensor supported by the air separation module and fluidly coupled to the compressed air source by the filter module mount portion;
a flow control valve supported by the air separation module and fluidly coupled to the compressed air source by the filter module mount portion; and
a fuel tank fluidly coupled to the compressed air source by the filter module mount portion.

19. A method of making an air separation module, comprising:
fixing a separator within a canister, the separator being configured to separate a compressed air flow into an oxygen-enriched air flow fraction and an oxygen-depleted air flow fraction;
connecting a nominal length one-piece cap to the canister, wherein the nominal length one-piece cap has a filter module mount portion on a side of the one-piece cap opposite the separator to support a filter module with the air separation module; and
connecting an elongated-length one-piece cap to the second end of the canister, the elongated-length one-piece including an elongated one-piece cap fixation feature for fixation of the air separation module within a vehicle.

* * * * *